(12) United States Patent
McConville et al.

(10) Patent No.: US 7,607,671 B2
(45) Date of Patent: Oct. 27, 2009

(54) LIGHT WEIGHT SUSPENSION SYSTEM

(75) Inventors: James McConville, Ann Arbor, MI (US); Sunil Lall, Birmingham, MI (US); Darren Somerset, Bloomfield Hills, MI (US)

(73) Assignee: Axletech International IP Holdings LLC, Troy, MI (US)

( * ) Notice: Subject to any disclaimer, the term of this patent is extended or adjusted under 35 U.S.C. 154(b) by 527 days.

(21) Appl. No.: 11/286,994

(22) Filed: Nov. 23, 2005

(65) Prior Publication Data

US 2006/0186628 A1 Aug. 24, 2006

Related U.S. Application Data

(60) Provisional application No. 60/630,651, filed on Nov. 23, 2004.

(51) Int. Cl.
  *B60G 7/00* (2006.01)
(52) U.S. Cl. .......................... 280/124.134; 280/124.135
(58) Field of Classification Search ............ 280/93.512, 280/124.109, 124.135, 124.125, 124.138, 280/124.139, 124.141, 124.143
See application file for complete search history.

(56) References Cited

U.S. PATENT DOCUMENTS

| | | | |
|---|---|---|---|
| 1,448,268 A | 3/1923 | Gasparri et al. |
| 2,011,239 A | 8/1935 | Christman |
| 2,074,103 A | 3/1937 | Chryst |
| 2,131,661 A | 9/1938 | Heyermans et al. |
| 2,233,145 A | 2/1941 | Schimek |
| 2,549,320 A | 4/1951 | Makin |
| 2,658,748 A | 11/1953 | Premoli |
| 2,913,253 A | 11/1959 | Taber |
| 3,007,711 A | 11/1961 | Randrup |
| 3,400,947 A | 9/1968 | Cottrill |
| 3,598,385 A | 8/1971 | Parsons |
| 3,787,073 A | 1/1974 | Lievore |
| 4,278,270 A | 7/1981 | Fry |
| 4,657,271 A | 4/1987 | Salmon |

(Continued)

FOREIGN PATENT DOCUMENTS

| | | | |
|---|---|---|---|
| JP | 01212604 A | 8/1989 |
| JP | 06055918 A | 3/1994 |

*Primary Examiner*—Eric Culbreth
(74) *Attorney, Agent, or Firm*—Howard & Howard Attorneys PLLC

(57) ABSTRACT

The subject invention provides an independent wheel suspension system (20) for a vehicle. The suspension system (20) includes an lateral support (26) and a pair of lower lateral links (30, 32) spaced from the lateral support (26). A tall knuckle (36) extends between the lateral support (26) and the pair of lower lateral links (30, 32). The lateral support (26) and the pair of lateral links (30, 32) are pivotably connected to the knuckle (36). A rod (64) is pivotably connected to the knuckle (36) adjacent the pivotal connection between the lateral support (26) and the knuckle (36) and extends inward and downward toward the vehicle to a second end (68). A crank (70) is pivotable connected to the vehicle for rotation by the rod (64) in response to vertical movement of the knuckle (36) relative to the vehicle. The second end (68) of the rod (64) is connected the crank (70). A dampening device (72) is attached to the vehicle and the crank (70) for controlling movement of the crank (70).

37 Claims, 6 Drawing Sheets

U.S. PATENT DOCUMENTS

| | | |
|---|---|---|
| 4,842,296 A | 6/1989 | Kubo |
| 5,080,389 A | 1/1992 | Kawano et al. |
| 5,100,165 A | 3/1992 | Hespelt |
| 5,348,334 A | 9/1994 | Giltinan |
| 5,496,055 A | 3/1996 | Shibahata et al. |
| 6,113,120 A | 9/2000 | Heap |
| 6,550,796 B2 | 4/2003 | Behr |
| 6,702,307 B2 | 3/2004 | Becker et al. |
| 6,764,084 B1 | 7/2004 | Nakamura et al. |
| 2005/0110235 A1 * | 5/2005 | LeBlanc et al. ....... 280/124.135 |

* cited by examiner

LIGHT WEIGHT SUSPENSION SYSTEM

CROSS REFERENCE TO RELATED APPLICATION

This application claims the benefit of U.S. Provisional Patent Application Ser. No. 60/630,651, which was filed on Nov. 23, 2004.

BACKGROUND OF THE INVENTION

1. Field of the Invention

The subject invention relates to an independent wheel suspension system for a vehicle.

2. Description of the Prior Art

Various types of suspension systems are known in the prior art for supporting automotive vehicles. These suspension systems have been modified in various manners in attempts to decrease the weight of the suspension system, thereby improving performance of the suspension system, decreasing the weight of the vehicle, and increasing the fuel efficiency of the vehicle.

U.S. Pat. No. 6,702,307 discloses one such independent wheel suspension system for a vehicle. This suspension system includes an lateral control arm having an upper pair of links. A pair of lower links extending laterally to a distal end from the vehicle. The upper and lower pair of lateral links are rotatably connected to the vehicle for up and down movement relative to the vehicle. A knuckle extends between the distal ends of the lower pair of lateral links and the upper pair of lateral links. The knuckle is pivotably connected to the upper pair of lateral links and the lower pair of lateral links for rotation about a king pin axis for steering the vehicle. A rod having a first end is pivotably connected to the knuckle adjacent the pivotal connection of the lower pair of lateral links and the knuckle. The rod extends inward and downward toward the vehicle to a second end. A crank is pivotably connected to the vehicle and is attached to the second end of the rod at a position spaced from the pivotal connection interconnecting the crank and the vehicle. The crank is for pivotal movement by the rod in response to vertical movement of the knuckle relative to the vehicle. A dampening device is attached to the crank and the vehicle for controlling pivotal movement of the crank.

Although the prior art designs, including the design disclosed in the '307 patent, may be adequate for their intended purposes, these designs can be inadequate for certain applications, such as for off-highway vehicles.

SUMMARY OF THE INVENTION AND ADVANTAGES

The subject invention provides a wheel suspension system for a vehicle with the suspension system including a housing. A lateral support extends laterally to a knuckle end from the housing. The lateral support is pivotably attached to the housing for up and down movement. A first link and a second link each extend laterally to a distal end from the housing. The first link and the second link are pivotably connected to the housing in spaced relationship to the lateral support for up and down movement. A knuckle is pivotably connected to the knuckle end of the lateral support at one end and pivotably connected to the distal ends of the first link and the second link at an opposing end. A rod having a first end is pivotably connected to the knuckle and extends to a second end. A crank is pivotably connected to the housing and is attached to the second end of the rod at a position spaced from the pivotal connection to the housing for pivotal movement by the rod in response to vertical movement of the knuckle relative to the housing. A dampening device is attached to the crank and the housing for controlling pivotal movement of the crank. The first end of the rod is pivotably attached to the knuckle adjacent the lateral support.

The wheel suspension system can also include a wheel hub rotatably supported by the knuckle for rotation about a rotational axis. Further, a drive shaft can extend from the housing through the knuckle and connect to the wheel hub for rotating the wheel hub about the rotational axis. In this suspension system, the placement of the rod allows the drive shaft to extend through the knuckle without interference from the rod.

In addition, the knuckle can be a steering knuckle that rotates about a king pin axis for steering the vehicle. The knuckle would be connected to the distal ends of the first and second links at positions spaced laterally from the king pin axis for rotation about the king pin axis, whereby the king pin axis is skewed relative to the connection between the knuckle and the lateral support in response to rotation of the knuckle about the king pin axis. This configuration of the suspension system minimizes movement of the rod in response to rotational movement of the knuckle about the king pin axis.

Accordingly, the subject invention provides an improved independent suspension system by connecting the rod adjacent the top of the knuckle, thereby creating a design that is suitable for off-highway applications while improving handling of the vehicle by minimizing effects felt in the steering caused by the suspension system when an operator rotates the knuckle about the king pin axis to steer the vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, an independent wheel suspension system is shown generally at 20 in FIGS. 1-5. The suspension system 20 includes a housing 22, which is attached to a vehicle (not shown). The housing 22 is supported by and between parallel frame-rails 24 of the vehicle. For clarity, only one of the parallel frame-rails 24 is shown in the figures.

Figure 1:
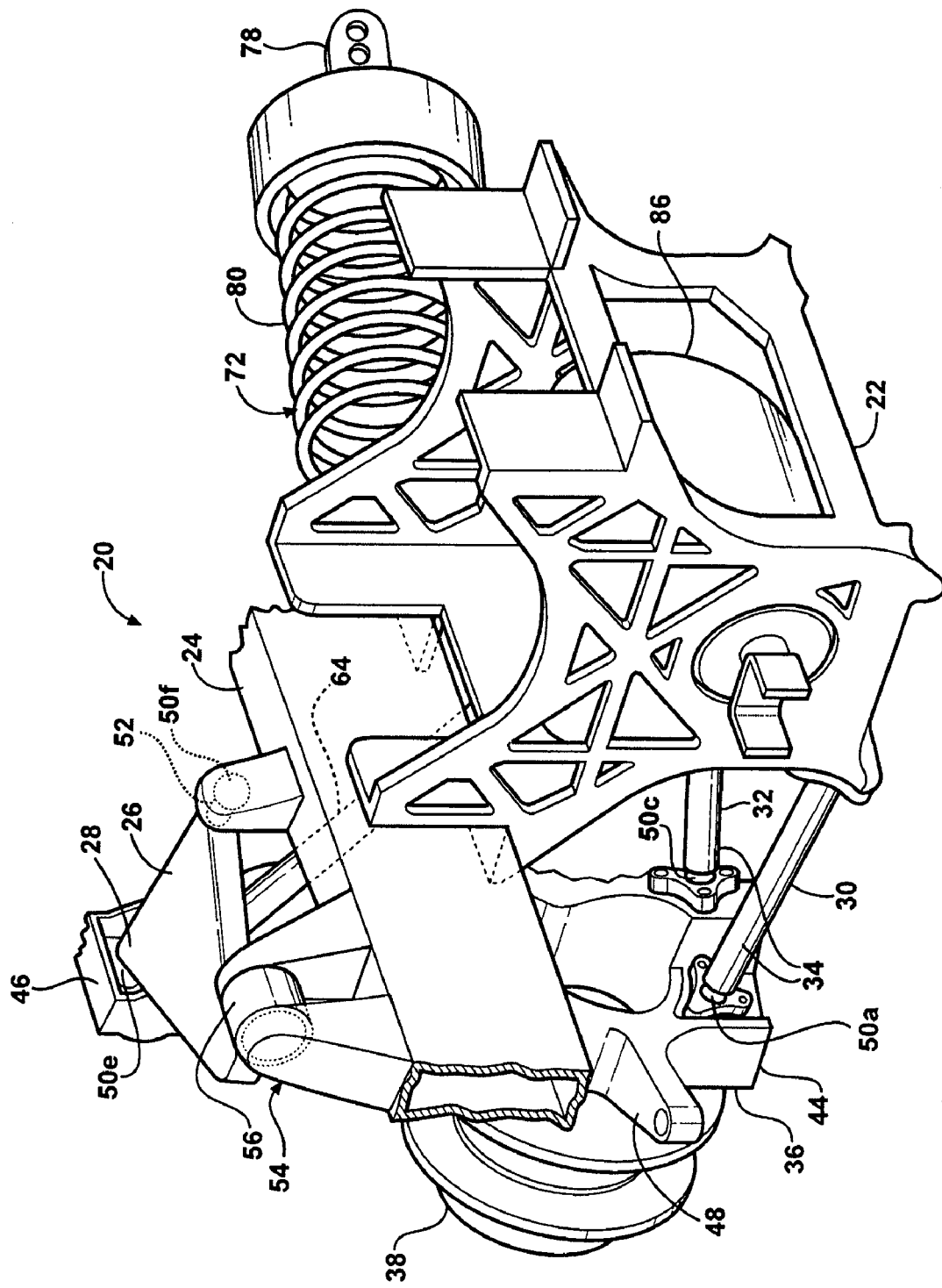
FIG. 1 is perspective view of an independent wheel suspension system for a vehicle in accordance with the subject invention.
Figure 2:
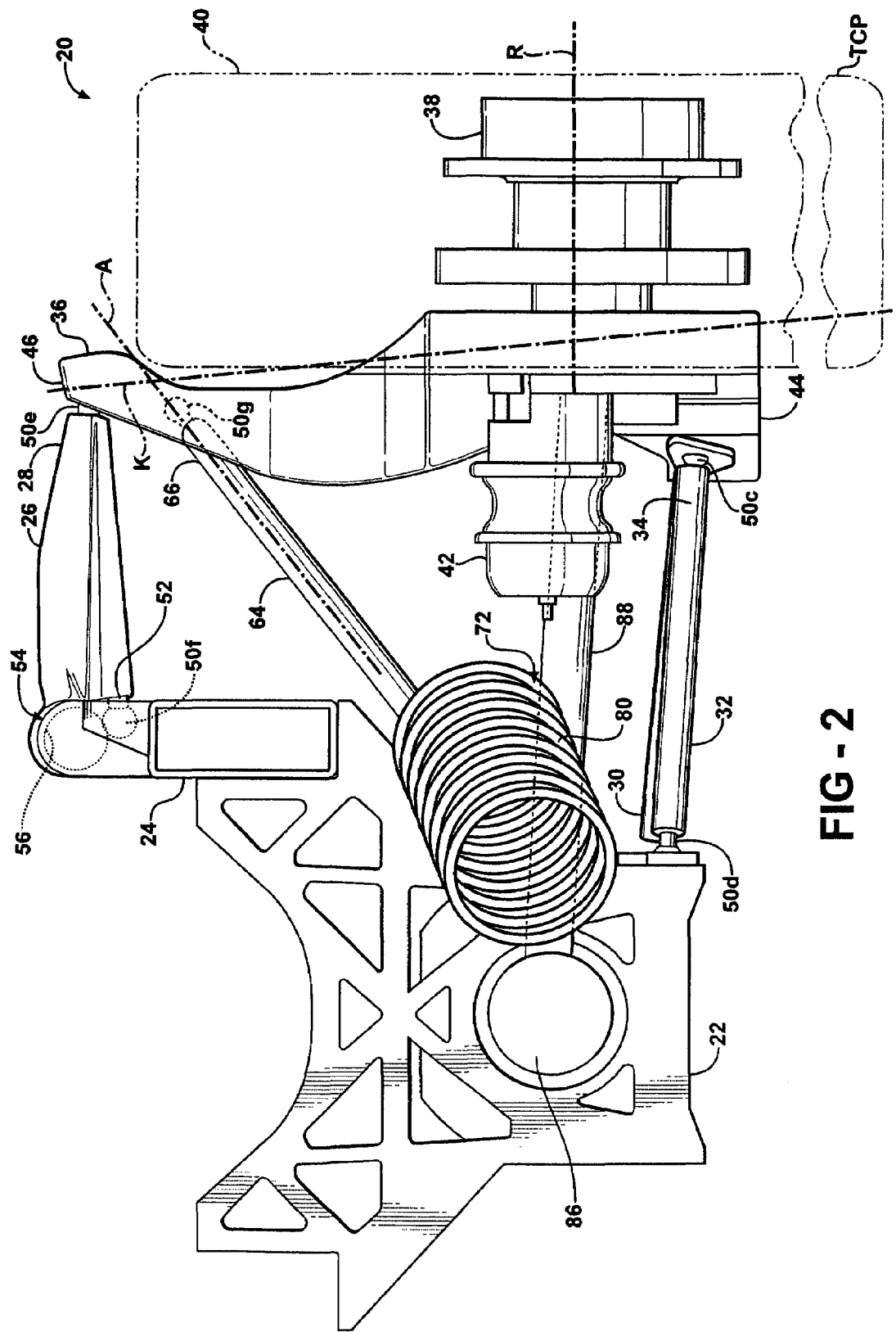
FIG. 2 is a rear view of the suspension system.
Figure 3:
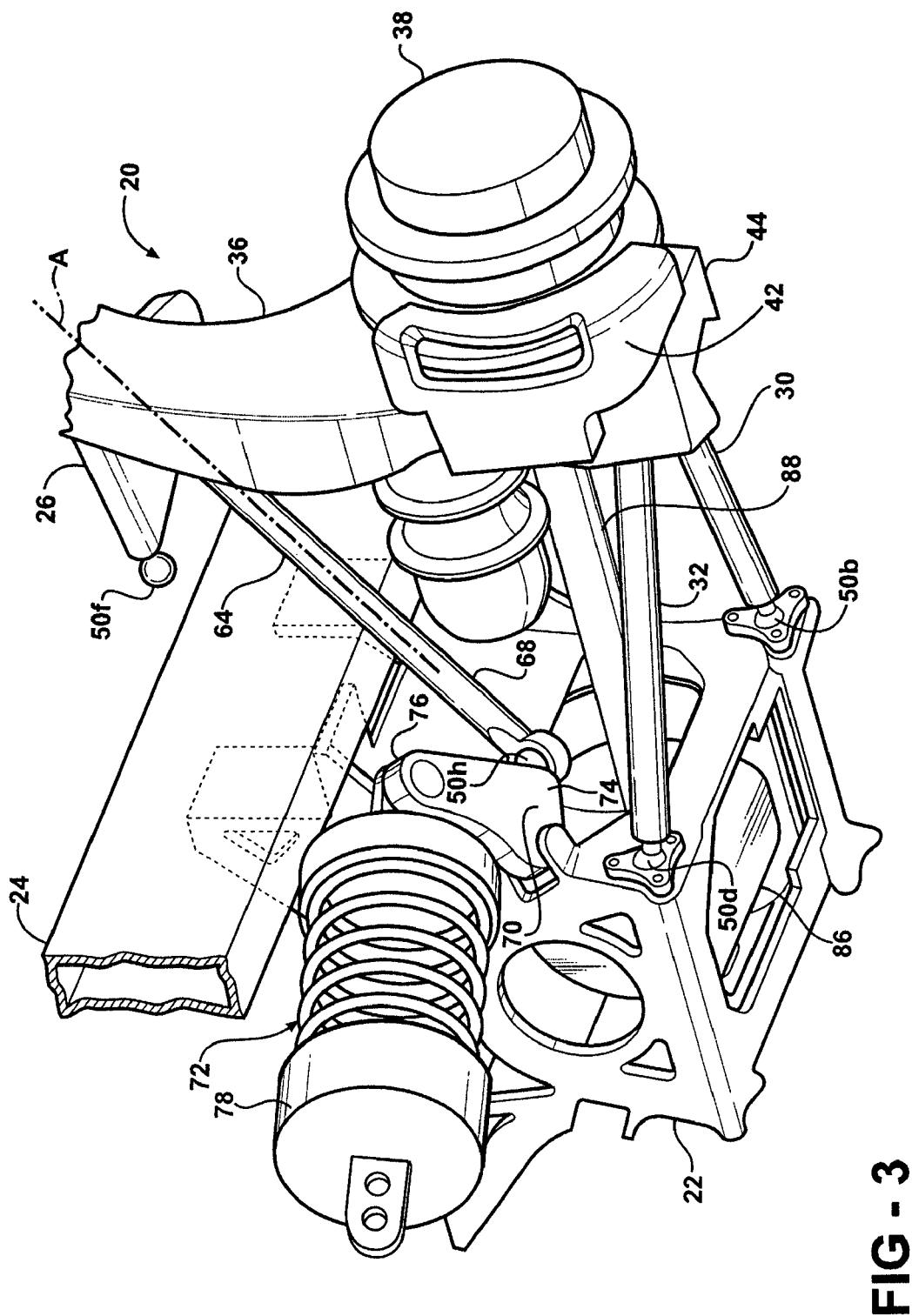
FIG. 3 is another perspective view of the suspension system.
Figure 5:
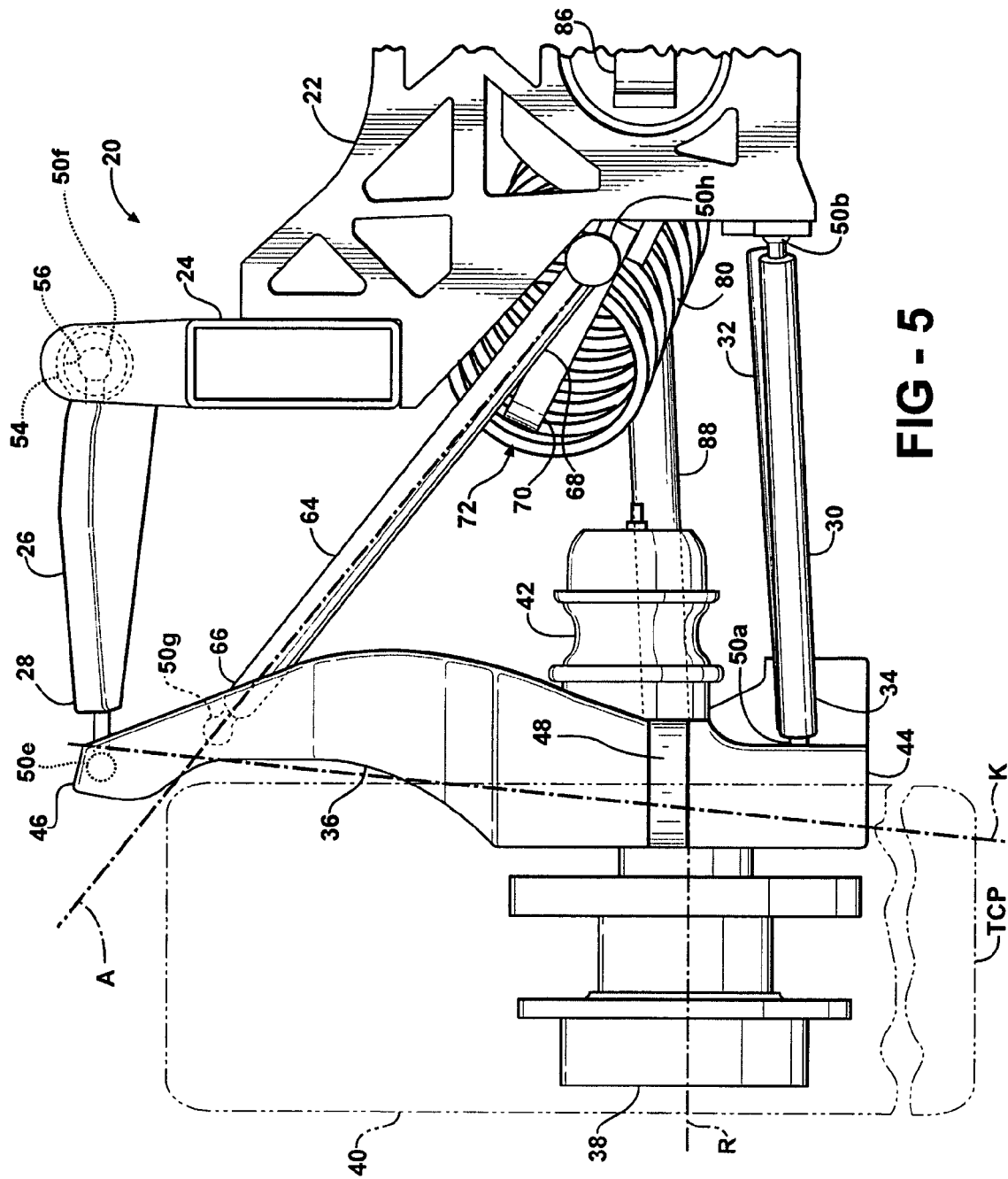
FIG. 5 is a front view of the suspension system.

As best shown in FIGS. 1, 2, and 5, a lateral support 26 extends laterally to an outboard or knuckle end 28 from the housing 22. The lateral support 26, which in the preferred embodiment is shown as a lateral control arm, is pivotably coupled relative to the housing 22 for up and down movement. As depicted in FIGS. 1, 2, and 5, the lateral support 26 is pivotably connected to the frame-rails 24 of the vehicle. As also discussed below, the suspension system 20 includes a plurality of ball joints. The knuckle end 28 includes a ball joint 50e extending therefrom. The lateral support 26 further includes a first connection point 52 and a second connection point 54 coupling the lateral support 26 relative to the housing 22 and specifically attaching to the frame-rails 24 of the vehicle. It should be understood that the configuration of the first connection point 52 and the second connection point 54 will vary depending upon the configuration of the vehicle.

As shown in FIGS. 1-3 and 5, the first connection point 52 includes a ball joint 50f pivotably interconnecting the lateral support 26 to the frame-rail 24 of the vehicle. The second connection point 54 includes a bushing 56 rotatably interconnecting the lateral support 26 to the frame-rail 24 of the vehicle for up and down movement of the lateral support 26 relative to the housing 22. As best shown in FIG. 2, the first connection point 52 (ball joint 50f) and the ball joint 50e are preferably aligned perpendicularly relative to a longitudinal axis of the housing 22 and the frame-rail 24 of the vehicle. Accordingly, the suspension system 20 provides a firm response to lateral loads applied to the ball joints 50e, 50f such that there is a stiff support given to the lateral support 26 in response to lateral forces applied to a tire contact patch TCP, which is the point where the tire 40, supported by a wheel hub 38, contacts the ground surface.

Figure 4:
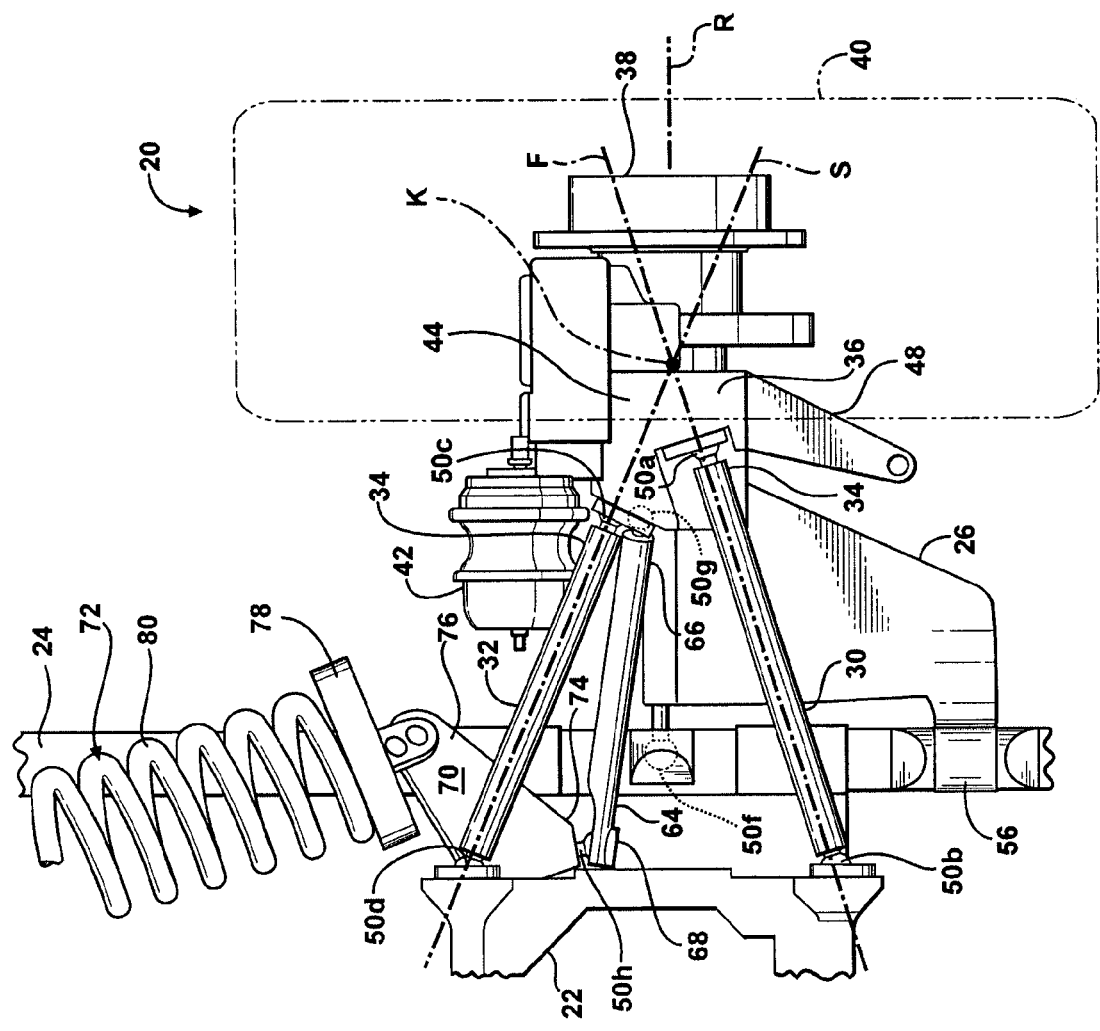
FIG. 4 is a bottom view of the suspension system.

As shown in FIGS. 2, 4, and 5, a first link 30 and a second link 32 each extend laterally to a distal end 34 from the housing 22. The first link 30 and the second link 32 are connected to the housing 22 in spaced relationship to the lateral support 26. The spaced relationship between the first and second links 30, 32 and the lateral support 26 defines a specific desired kinematic movement of the suspension system 20 for improving the handling of the vehicle. The first link 30 and the second link 32 are pivotably connected to the housing 22 for up and down movement. As mentioned above, the suspension system 20 includes a plurality of ball joints for pivotably interconnecting the various elements of the suspension system 20. A first pair of ball joints 50a, 50b pivotably interconnect the first link 30 to a knuckle 36 (described below) and the housing 22. Specifically, ball joint 50a pivotably interconnects the distal end 34 of the first link 30 to the knuckle 36 and ball joint 50b pivotably interconnects the first link 30 to the housing 22. A second pair of ball joints 50c, 50d pivotably interconnects the second link 32 to the knuckle 36 and the housing 22. Specifically, ball joint 50c pivotably interconnects the distal end 34 of the second link 32 to the knuckle 36 and ball joint 50d pivotably interconnects the second link 32 to the housing 22.

Referring to FIG. 4, the first link 30 includes a first link axis F extending longitudinally along the center of the first link 30. The ball joints 50a, 50b of the first link 30 are disposed axially along the first link axis F. The second link 32 includes a second link axis S extending longitudinally along the center of the second link 32. The ball joints 50c, 50d of the second link 32 are disposed axially along the second link axis S. The ball joints 50a, 50b, 50c, 50d are disposed along the first link axis F and the second link axis S for minimizing bending moments in the first link 30 and the second link 32. In other words, the loading of the first link 30 and the second link 32 is kept purely along the F axis and the S axis respectively, thus the first link 30 and the second link 32 need only absorb tensile and compressive loads, rather than any bending moments. Accordingly, the first link 30 and the second link 32 may be appropriately sized to accommodate the applied loads to reduce the weight of the first link 30 and the second link 32.

As best shown in FIGS. 2 and 5, the suspension system 20 further includes the wheel hub 38 rotatably supported by the knuckle 36 for rotation about a rotational axis R. The wheel hub 38 includes a tire 40 supported thereon for contacting a ground surface at the tire contact patch TCP. As depicted best in FIGS. 3 and 4, the wheel hub 38 further includes a braking mechanism 42 for slowing rotational movement of the wheel hub 38. It is contemplated that the suspension system 20 may be configured for a driven wheel hub 38 or a non-driven wheel hub 38. It should be understood that the driven wheel hub 38 might include a planetary gear reduction system. Referring back to FIGS. 2 and 5, if the suspension system 20 is configured for a driven wheel hub 38, a differential 86 will be disposed in the housing 22. A drive shaft 88 would extend from the differential 86 and the housing 22, through the knuckle 36, and be connected to the wheel hub 38 for drivingly rotating the wheel hub 38 about the rotational axis R. For illustrative purposes, the drive shaft 88 is removed in FIGS. 1 and 4. It should be understood that the differential 86 is operatively connected to an engine (not shown) and is for transmitting rotational movement produced by the engine to the wheel hub 38. It should also be understood that when the suspension system 20 is configured for a non-driven wheel hub 38, the housing 22 may not include the differential 86 and the drive shaft 88 for this wheel hub 38 would be eliminated. As appreciated by those skilled in the art, the wheel hub 38, whether driven or not, may be of any suitable design or configuration.

Turning to FIGS. 1, 2, and 5, the knuckle 36 is pivotably connected to the knuckle end 28 of the lateral support 26 at one end. Specifically, the ball joint 50e pivotably interconnects the knuckle end 28 of the lateral support 26 to the knuckle 36. The knuckle 36 is pivotably connected to the distal ends 34 of the first link 30 and the second link 32 at an opposing end. The knuckle 36 is positioned to be spaced laterally from a king pin axis K for rotation about the king pin axis K. Specifically, the knuckle 36 includes a bottom end 44 extending upwardly about the wheel hub 38 and the tire 40 to a top end 46. This type of knuckle 36 is commonly referred to as a tall knuckle 36. The knuckle 36 increases the offset between the lateral support 26 and the first 30 and second 32 links, which reduces lateral forces in the lateral support 26 and the first 30 and second 32 links as applied through the tire contact patch TCP. Accordingly, the lateral support 26 and the first 30 and second 32 links may be appropriately sized to accommodate the reduced lateral forces to reduce the weight of the lateral support 26 and the first 30 and second 32 links.

In order to reduce the weight of the suspension system 20, it is contemplated that the lateral support 26 and the knuckle 36 be formed of a light-weight material, such as aluminum.

The suspension system 20 can be configured for a steering wheel hub 38 of the vehicle, such as shown. Accordingly, the knuckle 36 includes a steering arm 48 extending therefrom for connection to a steering mechanism (not shown). It should be understood that the steering mechanism is operatively connected to the steering arm 48 of the knuckle 36, and operates to rotate the knuckle 36 about the king pin axis K for steering the vehicle. Steering mechanisms of the type used in automotive vehicles are well known in the art and not discussed in detail herein. It should be understood that the suspension system 20 might also be configured for a non-steering wheel hub 38. When configured for a non-steering wheel hub 38, the steering arm 48 may be connected to the housing 22 via a lateral link having a ball joint at both ends (not shown). Alternatively, the knuckle 36 will not include the steering arm 48. Hence, the knuckle 36 does not rotate about the king pin axis K for steering the vehicle.

As best shown in FIGS. 2-5, a rod 64 having a first end 66 is pivotably connected to the knuckle 36 and extends to a second end 68. The first end 66 of the rod 64 is pivotably attached to the knuckle 36 adjacent the lateral support 26. A crank 70 is pivotably connected to the housing 22 and is attached to the second end 68 of the rod 64 at a position spaced from the pivotal connection to the housing 22 for pivotal movement by the rod 64 in response to vertical movement of the knuckle 36 relative to the housing 22.

A ball joint 50g pivotably interconnects the first end 66 of the rod 64 to the knuckle 36. A ball joint 50h pivotably interconnects the second end 68 of the rod 64 to the crank 70. The rod 64 includes a rod axis A extending longitudinally along the center of the rod 64. The ball joints 50g, 50h of the rod 64 are disposed axially along the rod axis A. The ball joints 50g, 50h are disposed along the rod axis A for minimizing bending moments in the rod 64. Accordingly, the rod 64 may be appropriately sized to accommodate the applied loads to reduce the weight of the rod 64. The rod 64 primarily acts in tension as the suspension system 20 moves upward relative to the housing 22 to pull on the crank 70 in response to the vertical movement of the knuckle 36.

A dampening device 72 is attached to the crank 70 and the housing 22 for controlling pivotal movement of the crank 70. The crank 70 includes a first arm 74 extending laterally from the pivotable connection of the crank 70 to the housing 22 for attachment to the second end 68 of the rod 64. A second arm 76 extends laterally from the pivotable connection for attachment to the dampening device 72.

A pair of brackets 78 mounts the dampening device 72 between the housing 22 and the crank 70. For illustrative purposes, one or more of the brackets 78 is removed in FIGS. 1, 2, and 5. The brackets 78 are shown somewhat schematically in the Figures and can include a pocket for receiving the dampening device 72 therein. The precise configuration of the brackets 78 is dependent upon the configuration of the dampening device 72 and design restraints of the vehicle. As depicted in the Figures, the dampening device 72 includes a coil spring 80. However, it should be understood that the dampening device 72 may include any mechanism suitable for controlling movement of the crank 70 and urging the crank 70 and the suspension system 20 back into a neutral position. Accordingly, the dampening device 72 may include an air spring, a shock absorber, or some other similar device. It should be understood that the configuration of the connection between the second arm 76 of the crank 70 and the dampening device 72 depends upon the configuration of the dampening device 72.

It should be appreciated that having the rod 64 pivotably attached to the knuckle 36 adjacent the lateral support 26 allows the drive shaft 88 to extend through the knuckle 36 without interference from the rod 64. Accordingly, the suspension system 20 is suitable for use with both a driven wheel hub 38 and a non-driven wheel hub 38. Off-highway vehicles, such as many military vehicles, include a number of driven wheel hubs 38, which can also include a driven steering wheel hub 38. The mounting configuration of the rod 64 provides a suitable solution for this type of driven steering wheel end 38.

Referring to FIGS. 2, 4, and 5, the king pin axis K extends through a first point defined by the pivotal connection interconnecting the lateral support 26 and the knuckle 36 and a projected second point defined by the instantaneous intersection of the first link axis F and the second link axis S. When configured for a steering wheel hub 38, the steering mechanism rotates the knuckle 36 about the king pin axis K. The first point of the king pin axis K is fixed relative to the knuckle 36, while the second point of the king pin axis K floats during rotation of the knuckle 36. Accordingly, as the second point moves, the king pin axis K will skew relative to the first point.

In other words, as the first link 30 and the second link 32 are pivotably connected to the knuckle 36 at positions laterally spaced from the second point (instantaneous intersection of the first link axis F and the second link axis S) it should be understood that the projected second point will change positions laterally with respect to the first point and the housing 22 as the knuckle 36 rotates about the king pin axis K. Hence, the king pin axis K is skewed relative to the connection point between the knuckle 36 and the lateral support 26 in response to rotation of the knuckle 36 about the king pin axis K. It should be understood that the skewing of the king pin axis K results in movement of the rod 64, which is opposed by the dampening device 72. This can result in steering feedback from the suspension system 20 through the steering mechanism. Therefore, the rod 64, being responsive to lateral movement of the knuckle 36 caused by rotational movement of the knuckle 36 about the king pin axis K, is positioned adjacent the pivotal connection interconnecting the lateral support 26 and the knuckle 36. This positioning of the rod 64 minimizes movement of the rod 64 in response to rotational movement of the steering knuckle 36 about the king pin axis K. This positioning of the rod 64 also reduces lateral offsets between the center of the wheel hub 38 and the king pin axis K and between the tire contact patch TCP and the kin pin axis K. Steering corruption performance due to ground surface undulations is therefore improved, which in turn improves steering feedback quality to a driver. This is because the king pin axis K has minimum float relative to the housing 22 at the connection point interconnecting the lateral support 26 and the knuckle 36 (the first point of the king pin axis K). The steering feedback is therefore reduced the closer the rod 64 is attached to the pivotable connection between the lateral support 26 and the knuckle 36.

Figure 7:
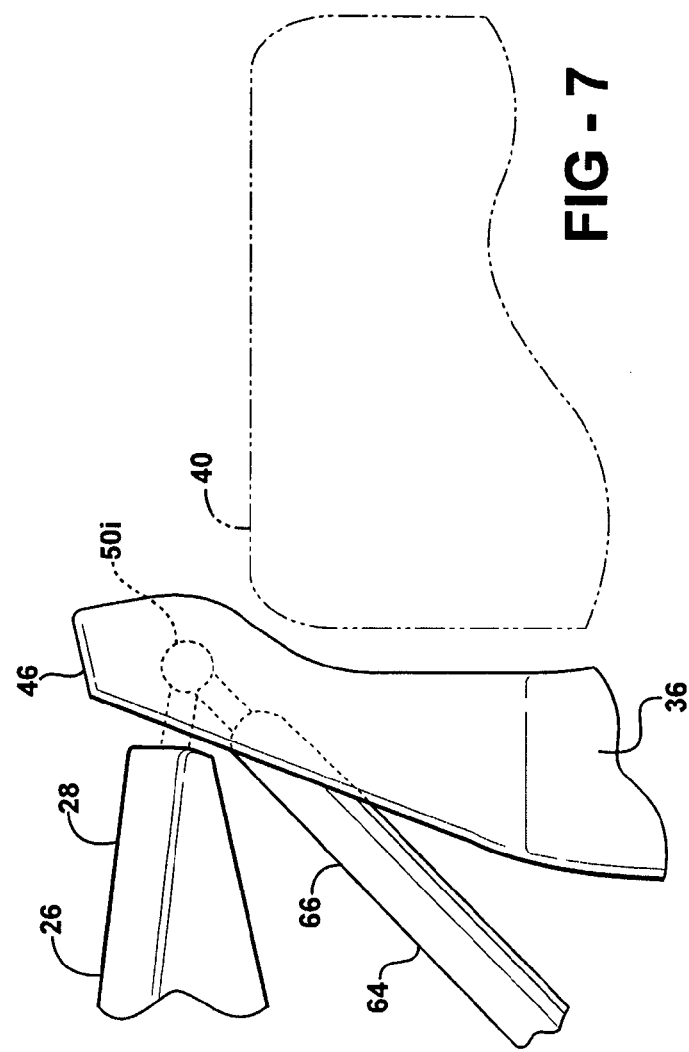
FIG. 7 is an enlarged fragmentary view of a connection between an lateral support, a knuckle, and a rod.

Alternatively, as shown in FIG. 7, the system may include a single rotational joint 50i pivotably interconnecting the knuckle end 28 of the lateral support 26 and the first end 66 of the rod 64 to the steering knuckle 36, thereby eliminating all movement of the rod 64 from lateral movement of the knuckle 36 caused by rotation of the knuckle 36 about the king pin axis K.

Figure 6:
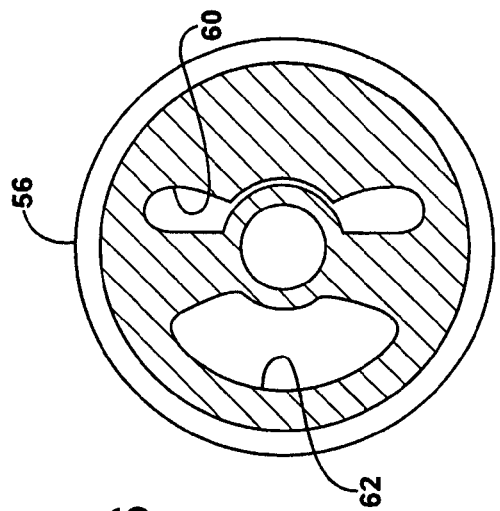
FIG. 6 is a cross sectional view of a dual rate bushing.

Referring to FIG. 6, the bushing 56 preferably includes a first portion 60 defining a first resistance to lateral deflection and a second portion 62 defining a second resistance to lateral deflection in an opposite direction with the first resistance being greater than the second resistance to define a dual rate bushing. It should be understood that the dual rate bushing is designed to provide a differing resistance to longitudinally applied forces through the wheel hub 38. The longitudinally applied forces typically applied through the wheel hub 38 include a braking force and an impact force. The braking force is applied to the wheel hub 38 at the tire contact patch TCP, which is the point where the tire 40 supported by the wheel hub 38 contacts the ground surface. The braking force will tend to urge the knuckle end 28 of the lateral support 26 in a forward longitudinal direction relative to the vehicle. The dual rate bushing includes the first portion 60 having the first, relatively stiff, resistance against the longitudinal movement of the knuckle end 28 of the lateral support 26 caused by the braking force for improving the handling characteristics of the vehicle. The impact force, on the other hand, is applied longitudinally to the wheel hub 38 through the rotational axis R of the wheel hub 38. The impact force will tend to urge the knuckle end 28 of the lateral support 26 in a rearward longitudinal direction relative to the vehicle that is opposite from the direction caused by the braking force. The dual rate bushing includes the second portion 62 having the second, relatively soft, resistance against the longitudinal movement of the knuckle end 28 of the lateral support 26 caused by the impact force for improving the ride characteristics of the vehicle.

The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A wheel suspension system (20) for a vehicle, said system comprising;
a housing (22),
a lateral support (26) extending laterally to a knuckle end (28) from and pivotably coupled relative to said housing (22) for up and down movement,
a first link (30) and a second link (32) each extending laterally to a distal end (34) from and pivotably connected to said housing (22) in spaced relationship to said lateral support (26) for up and down movement,
a knuckle (36) pivotably connected to said knuckle end (28) of said lateral support (26) for rotation about a king pin axis (K) for steering the vehicle,
said knuckle (36) pivotably connected to said distal ends (34) of said first link (30) and said second link (32) at laterally spaced positions spaced from said king pin axis (K) for rotation about said king pin axis (K) whereby said king pin axis (K) is skewed relative to said connection between said knuckle (36) and said lateral support (26) in response to rotation of said knuckle (36) about said king pin axis (K),
a rod (64) having a first end (66) pivotably connected to said knuckle (36) and extending to a second end (68),
a crank (70) having a pivotal connection pivotably connected to said housing (22) and attached to said second end (68) of said rod (64) at a position spaced from said pivotal connection of said crank (70) to said housing (22) for pivotal movement by said rod (64) in response to vertical movement of said knuckle (36) relative to said housing (22) and rotational movement of said knuckle (36) about said king pin axis (K), and
a dampening device (72) attached to said crank (70) and said housing (22) for controlling pivotal movement of said crank (70),
said first end (66) of said rod (64) being pivotably attached to said knuckle (36) adjacent said lateral support (26) for minimizing movement of said rod (64) in response to rotational movement of said knuckle (36) about said king pin axis (K).

2. A system as set forth in claim 1 further including a ball joint (50a) pivotably interconnecting said distal end (34) of said first link (30) to said knuckle (36) and another ball joint (50c) pivotably interconnecting said distal end (34) of said second link (32) to said knuckle (36).

3. A system as set forth in claim 2 further including a ball joint (50b) pivotably interconnecting said first link (30) to said housing (22) and another ball joint (50d) pivotably interconnecting said second link (32) to said housing (22).

4. A system as set forth in claim 3 wherein said first link (30) includes a first link axis (F) extending longitudinally along a center of said first link (30) with and said ball joints (50a, 50b) of said first link (30) disposed axially along said first link axis (F), and wherein said second link (32) includes a second link axis (S) extending longitudinally along a center of said second link (32) with said ball joints (50c, 50d) of said second link (32) disposed axially along said second link axis (S).

5. A system as set forth in claim 1 further including a ball joint (50g) pivotably interconnecting said first end (66) of said rod (64) to said knuckle (36).

6. A system as set forth in claim 5 further including a ball joint (50h) pivotably interconnecting said second end (68) of said rod (64) to said crank (70).

7. A system as set forth in claim 6 wherein said rod (64) includes a rod axis (A) extending longitudinally along a center of said rod (64) with said ball joints (50g, 50h) of said rod (64) disposed axially along said rod axis (A).

8. A system as set forth in claim 1 further including a rotational joint (50i) pivotably interconnecting said knuckle end (28) of said lateral support (26) and said first end (66) of said rod (64) to said knuckle (36).

9. A system as set forth in claim 1 wherein said knuckle (36) includes a steering arm (48) extending therefrom for connection to a steering mechanism.

10. A system as set forth in claim 1 wherein said crank (70) includes a first arm (74) extending from said pivotable connection of said crank (70) for attachment to said second end (68) of said rod (64) and a second arm (76) extending from said pivotable connection for attachment to said dampening device (72).

11. A system as set forth in claim 1 further including a ball joint (50e) pivotably interconnecting said knuckle end (28) of said lateral support (26) to said knuckle (36) and said lateral support (26) further including a first connection point (52) and a second connection point (54) for coupling relative to said housing (22).

12. A system as set forth in claim 11 wherein said first connection point (52) includes a ball joint (50f) pivotably coupling said lateral support (26) relative to said housing (22).

13. A system as set forth in claim 11 wherein said second connection point (54) includes a bushing (56) rotatably coupling said lateral support (26) and said housing (22) for up and down movement of said lateral support (26) relative to said housing (22).

14. A system as set forth in claim 13 wherein said bushing (56) includes a first portion (60) defining a first resistance to lateral deflection and a second portion (62) defining a second resistance to lateral deflection in an opposite direction with the first resistance being greater than the second resistance to define a dual rate bushing (58).

15. A system as set forth in claim 11 wherein said first connection point (52) and said ball joint (50e) are aligned perpendicularly relative to a longitudinal axis of said housing (22).

16. A system as set forth in claim 1 wherein said lateral support (26) is formed of a material including aluminum.

17. A system as set forth in claim 1 wherein said knuckle (36) is formed of a material including aluminum.

18. A system as set forth in claim 1 further including a wheel end (38) rotatably supported by said knuckle (36) for rotation about a rotational axis (R).

19. A system as set forth in claim 18 further including a drive shaft (88) extending from said housing through said knuckle (36) and connected to said wheel end (38) for rotating said wheel end (38) about said rotational axis (R).

20. A wheel suspension system (20) for a vehicle, said system comprising;
 a housing (22),
 a lateral support (26) extending laterally to a knuckle end (28) from and pivotably coupled relative to said housing (22) for up and down movement,
 a first link (30) and a second link (32) each extending laterally to a distal end (34) from and pivotably connected to said housing (22) in spaced relationship to said lateral support (26) for up and down movement,
 a knuckle (36) pivotably connected to said knuckle end (28) of said lateral support (26) at one end and pivotably connected to said distal ends (34) of said first link (30) and said second link at an opposing end,
 a rod (64) having a first end (66) pivotably connected to said knuckle (36) and extending to a second end (68),
 a crank (70) having a pivotal connection pivotably connected to said housing (22) and attached to said second end (68) of said rod (64) at a position spaced from said pivotal connection of said crank (70) to said housing (22) for pivotal movement by said rod (64) in response to vertical movement of said knuckle (36) relative to said housing (22),
 a dampening device (72) attached to said crank (70) and said housing (22) for controlling pivotal movement of said crank (70),
 a wheel end (38) rotatably supported by said knuckle (36) for rotation about a rotational axis (R), and
 a drive shaft (88) extending from said housing through said knuckle (36) and connected to said wheel end (38) for rotating said wheel end (38) about said rotational axis (R),
 said rod (64) being pivotably attached to said knuckle (36) adjacent said lateral support (26) for allowing said drive shaft (88) to extend through said knuckle (36) without interference from said rod (64).

21. A system as set forth in claim 20 further including a ball joint (50a) pivotably interconnecting said distal end (34) of said first link (30) to said knuckle (36) and another ball joint (50c) pivotably interconnecting said distal end (34) of said second link (32) to said knuckle (36).

22. A system as set forth in claim 21 further including a ball joint (50b) pivotably interconnecting said first link (30) to said housing (22) and another ball joint (50d) pivotably interconnecting said second link (32) to said housing (22).

23. A system as set forth in claim 22 wherein said first link (30) includes a first link axis (F) extending longitudinally along a center of said first link (30) with said ball joints (50a, 50b) of said first link (30) disposed axially along said first link axis (F), and wherein said second link (32) includes a second link axis (S) extending longitudinally along a center of said second link (32) with said ball joints (50c, 50d) of said second link (32) disposed axially along said second link axis (S).

24. A system as set forth in claim 20 further including a ball joint (50g) pivotably interconnecting said first end (66) of said rod (64) to said knuckle (36).

25. A system as set forth in claim 24 further including a ball joint (50h) pivotably interconnecting said second end (68) of said rod (64) to said crank (70).

26. A system as set forth in claim 25 wherein said rod (64) includes a rod axis (A) extending longitudinally along a center of said rod (64) with said ball joints (50g, 50h) of said rod (64) disposed axially along said rod axis (A).

27. A system as set forth in claim 20 further including a rotational joint (50i) pivotably interconnecting said knuckle end (28) of said lateral support (26) and said first end (66) of said rod (64) to said knuckle (36).

28. A system as set forth in claim 20 further including a ball joint (50e) pivotably interconnecting said knuckle end (28) of said lateral support (26) to said knuckle (36) and said lateral support (26) further including a first connection point (52) and a second connection point (54) for coupling relative to said housing (22).

29. A system as set forth in claim 28 wherein said first connection point (52) includes a ball joint (50f) pivotably coupling said lateral support (26) relative to said housing (22).

30. A system as set forth in claim 28 wherein said second connection point (54) includes a bushing (56) rotatably coupling said lateral support (26) relative to said housing (22) for up and down movement of said lateral support (26) relative to said housing (22).

31. A system as set forth in claim 30 wherein said bushing (56) includes a first portion (60) defining a first resistance to lateral deflection and a second portion (62) defining a second resistance to lateral deflection in an opposite direction with the first resistance being greater than the second resistance to define a dual rate bushing (58).

32. A system as set forth in claim 28 wherein said first connection point (52) and said ball joint (50e) are aligned perpendicularly relative to a longitudinal axis of said housing (22).

33. A wheel suspension system (20) for a vehicle, said system comprising;
 a housing (22),
 a lateral support (26) extending laterally to a knuckle end (28) from and pivotably coupled relative to said housing (22) for up and down movement,
 a first link (30) and a second link (32) each extending laterally to a distal end (34) from and pivotably connected to said housing (22) in spaced relationship to said lateral support (26) for up and down movement,
 a knuckle (36) pivotably connected to said knuckle end (28) of said lateral support (26) at the one end and pivotably connected to said distal ends (34) of said first link (30) and said second link (32) at an opposing end,
 a rod (64) having a first end (66) pivotably connected to said knuckle (36) and extending to a second end (68),
 a crank (70) having a pivotal connection pivotably connected to said housing (22) and attached to said second end (68) of said rod (64) at a position spaced from said pivotal connection of said crank (70) to said housing (22) for pivotal movement by said rod (64) in response to vertical movement of said knuckle (36) relative to said housing (22),
 a dampening device (72) attached to said crank (70) and said housing (22) for controlling pivotal movement of said crank (70), and
 a first pair of ball joints (50a, 50b) interconnecting said first link (30) to said knuckle (36) and said housing (22) and a second pair of ball joints (50c, 50d) interconnecting said second link (32) to said knuckle (36) and said housing (22),
 said first link (30) including a first link axis (F) extending longitudinally along a center of said first link (30) with said first pair of ball joints (50a, 50b) being disposed axially along said first link axis (F) and said second link (32) including a second link axis (S) extending longitudinally along a center of said second link (32) with said second pair of ball joints (50c, 50d) being disposed axially along said second link axis (S) for minimizing bending moments in said first link (30) and said second link (32).

34. A system as set forth in claim 33 further including a ball joint (50*g*) pivotably interconnecting said first end (66) of said rod (64) to said knuckle (36).

35. A system as set forth in claim 34 further including a ball joint (50*h*) pivotably interconnecting said second end (68) of said rod (64) to said crank (70).

36. A system as set forth in claim 35 wherein said rod (64) includes a rod axis (A) extending longitudinally along a center of said rod (64) with said ball joints (50*g*, 50*h*) of said rod (64) being disposed axially along said rod axis (A).

37. A system as set forth in claim 33 further including a rotational joint (50*i*) pivotably interconnecting said knuckle end (28) of said lateral support (26) and said first end (66) of said rod (64) to said knuckle (36).

* * * * *

UNITED STATES PATENT AND TRADEMARK OFFICE
CERTIFICATE OF CORRECTION

PATENT NO. : 7,607,671 B2  Page 1 of 1
APPLICATION NO. : 11/286994
DATED : October 27, 2009
INVENTOR(S) : James McConville et al.

It is certified that error appears in the above-identified patent and that said Letters Patent is hereby corrected as shown below:

Title Page
Item (73) Assignee:
    Please delete "Axletech" and insert --AxleTech--.

Column 8, Line 62
    After wheel, please delete "end" and insert --hub--.

Column 8, Line 66
    After wheel, please delete "end" and insert --hub--.

Column 8, Line 67
    After wheel, please delete "end" and insert --hub--.

Column 9, Line 27
    After wheel, please delete "end" and insert --hub--.

Column 9, Line 30
    After wheel, please delete "end" and insert --hub--.

Column 9, Line 31
    After wheel, please delete "end" and insert --hub--.

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,607,671 B2  Page 1 of 1
APPLICATION NO. : 11/286994
DATED : October 27, 2009
INVENTOR(S) : McConville et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this

Twelfth Day of October, 2010

David J. Kappos
*Director of the United States Patent and Trademark Office*